United States Patent [19]

Borchard

[11] Patent Number: 5,504,628
[45] Date of Patent: Apr. 2, 1996

[54] PASSIVE ATHERMALIZATION OF OPTICS

[75] Inventor: Joseph F. Borchard, Dallas, Tex.

[73] Assignee: Texas Instruments Incorporated, Dallas, Tex.

[21] Appl. No.: 180,631

[22] Filed: Jan. 13, 1994

[51] Int. Cl.$^6$ .......................... G02B 9/00; G02B 21/02; G02B 9/12; G02B 9/04

[52] U.S. Cl. .................. 359/796; 359/365; 359/661; 359/784; 359/793; 359/558

[58] Field of Search .................................. 359/784, 365, 359/793, 795, 786, 787, 661, 796, 558

[56] References Cited

U.S. PATENT DOCUMENTS

| | | | |
|---|---|---|---|
| 4,505,535 | 3/1985 | Neil | 359/773 |
| 5,363,235 | 11/1994 | Kiunke et al. | 359/365 |

OTHER PUBLICATIONS

"Athermal Infrared Optics", Robert Gibbons, Equipment Group, Feb. 1976, Texas Instruments Incorporated, pp. 1–12.

*Primary Examiner*—Scott J. Sugarman
*Attorney, Agent, or Firm*—René E. Grossman; Richard L. Donaldson

[57] ABSTRACT

A doublet lens is optically passively athermalized by choosing two lens materials that have approximately the same Abbe number and substantially different thermal coefficients of refractive index. The ratio of the powers of the lens elements is designed to provide the desired passive athermalization. A diffractive surface is used on one of the lens elements to correct for chromatic aberration. Because the Abbe numbers are approximately the same for the two lens materials, the chromatic correction does not significantly change with temperature. This allows the ratio of the powers of the lens elements to control the focal length of the doublet with temperature being independent of chromatic correction.

20 Claims, 1 Drawing Sheet

PASSIVE ATHERMALIZATION OF OPTICS

CROSS REFERENCE TO OTHER APPLICATION

This invention is related to Ser. No. 08/181,263, entitled "Infrared Continuous Zoom Telescope Using Diffractive Optics", filed concurrently herewith the contents of which are incorporated herein by reference.

BACKGROUND OF THE INVENTION

1. Field of the Invention

This invention relates to passive athermalization of a lens system.

2. Brief Description of the Prior Art

A perennial problem for imaging infrared optical systems has been thermal defocus. The serious effects of varying temperatures upon the behavior of optical systems have been a matter of concern to optical designers and users for many years. Largely because of the high refractive index change with temperature (dn/dT) of the common infrared materials, the overall power of most infrared systems is very sensitive to temperature.

The first serious treatment of the effect of temperature on optical performance was made by J. W. Perry, Proceedings of the Physical Society, 55, 257 (1943). Perry separated the thermal effects into five groups, these being, (1) variation in optical path length because of: (a) thermal expansion of the optical materials, (b) thermal change in the index of refraction, (c) thermal expansion of the mechanical mountings, (d) internal strain in optical materials caused by thermal changes in the materials themselves or their mechanical mounts, (2) low thermal conductivity of optical materials resulting in slow internal equalization of temperature, (3) atmospheric effects such as convection, inversions or other density variations in the media surrounding the system, (4) thermal variation in the transmission of spectrally selective components, such as narrowband optical filters and (5) thermal variation of the aberrational corrections.

With the exception of internal strain caused by thermal changes, which can be controlled by appropriate design, choice of materials and construction, and thermal variations in the transmission of spectrally selective components, the disturbing phenomena can be resolved into two broad classes, these being (A) homogeneous (i.e., those distributions which involve a variation of the mean temperature of the optical system with time, but where spatial variations within the system from the mean are negligible) and (B) heterogeneous (i.e., those distributions which arise from a spatial variation of temperature throughout the optical system, possibly varying with time but having a fixed mean value). These two broad classes are realized independently only under laboratory conditions. All naturally occurring phenomena are a combination of both homogeneous and heterogeneous effects. Nevertheless, many systems approach conditions where one or the other class becomes dominant.

The perceptible effects of a homogeneous temperature change are principally a shift in the position and size of the lens image. The heterogeneous distribution in general results in a loss of definition in the image which cannot be recovered by a simple focus shift.

The above considerations are equally valid for systems operating in the infrared region of the spectrum. For fixed-focus optical systems, the focus shift typical of a homogeneous temperature distribution is the major problem. The effects of the heterogeneous temperature distribution, while present, are swamped in the gross loss of modulation caused by simple thermal defocus. For typical infrared systems, the most significant factors in this shift are (1) thermal change in the index of refraction of the glass, (2) thermal expansion of the optical materials and (3) thermal expansion of the mechanical mounts. Thermal change of index of refraction is by far the most important effect in most infrared systems. As an example, the refractive index change with temperature (dn/dT) of germanium, the most common optical material used in the infrared spectral range, is approximately $400 \times 10^{-6}/°$ C. For comparison, the dn/dT of the common optical glass BK7 is $1.6 \times 10^{-6}/°$ C. at 5461 Å for 20° to 40° C. according to the Schott Optical Glass book. The index change with temperature for germanium is significantly (about 250 times) greater than for the visible optical glass. Furthermore, germanium is not unique in this respect among the candidate materials in the infrared spectral region.

The prior art methods of correction available to athermalize infrared optical systems are well known and can be broken into three general methods, these being (1) thermal correction wherein the optical system may be held at a constant temperature independent of the external environment, a number of existing systems, both infrared and visible having used this method in constructing a thermostatically controlled oven around the optical system; (2) thermo-mechanical correction wherein the expansion and contraction of various mechanical members of the optical system can be arranged to compensate for the image plane shift caused by thermo-optical effects, many systems having also used this method, some more successfully than others, some examples of this technique being the use of bimetallic belleville washers around the periphery of the lenses and/or focal planes and other systems having used thermal sensors such as thermocouples to sense the temperature of the optical system and then used this information to drive a motor that attempts to restore focus in an open-loop manner using previously calculated movements of lenses and/or focal planes; and (3) thermo-optical correction wherein the basic optical design can be planned with the intention of controlling thermal aberrations, this technique being totally passive and, if properly done, reducing the sensitivity of the system to both homogeneous and heterogeneous temperature effects.

The basic technique of thermo-optical correction is quite similar to the well-known techniques of controlling chromatic aberrations. However, the limited material choices available in the infrared region have made the simple theory difficult to apply in practice.

In a paper prepared by Robert Gibbons entitled "Athermal Infrared Optics", dated February 1976, the contents of which are incorporated herein by reference, passive athermalization of a doublet lens is described whereby two materials are chosen such that the ratio of the Abbe v-number and equivalent thermal v-number are the same for both materials. With this, a solution that corrects for chromatic aberration also maintains the focal length of the doublet with temperature changes. This is a one solution setup limited by choice of materials. If it is desirable to design the thermal correction, for example, to increase the focal length with temperature at the same rate as the expansion of the lens housing to maintain focus, the chromatic correction would be compromised. This concept does not have the ability to independently design thermal correction separate from chromatic correction.

U.S. Pat. No. 4,679,891 of Michael Roberts describes optical athermalization using a three lens solution. The first two lenses are from materials whose refractive indices are relatively temperature insensitive, one positive and one negative, which accomplishes most of the chromatic and spherical correction. The third lens is a negative lens made from a material whose refractive indices are relatively temperature sensitive and is of lower dispersion and higher refractive index than the first two lenses which accomplishes most of the thermal correction. Germanium is the only material known that will work well for the third lens in the 8 to 12 micron wave band. If germanium should be unsuitable for use because of its thermal absorption properties, this scheme could not be used because an alternate material for the third lens is not known. In the 3 to 5 micron wave band, germanium is very dispersive and will not function for the third lens. The materials available for 3 to 5 micron use are not as well suited for this concept. There is no known low dispersion material for this wave band, rather only some lower than others. As a result, there would be compromising or a push-pull of thermal correction vs. chromatic correction.

SUMMARY OF THE INVENTION

In accordance with the present invention, optical passive athermalization of a doublet is provided independent of chromatic correction. The amount of athermalization is controlled by designing the ratio of the powers of the lens elements while a diffractive surface independently corrects for chromatic aberration. For a system consisting of an afocal lens and an imager lens, the doublet objective lens composed of lenses 9 and 11 of the afocal lens corrects for thermal focal shift caused by changes in temperature. The doublet objective lens compensates for the focal shift caused not only by the optical materials, but also by the thermal expansion of the metal housing.

This is accomplished by choosing two lens materials that have approximately the same Abbe number and different thermal coefficients of refractive index. The ratio of the powers of the lens elements are designed to provide the desired passive athermalization. A diffractive surface is used on one of the lens elements to correct for chromatic aberration. Because the Abbe numbers are approximately the same for the two lens materials, the chromatic correction does not significantly change with temperature. This allows the ratio of the powers of the lens elements to control the focal length of the doublet with temperature independent of chromatic correction. This ratio can be calculated as set forth in the above referenced Gibbons paper so that the focal length of the doublet remains substantially the same with changes in temperature. This ratio can be modified for overcorrection so that the focal length increases with temperature at the same rate as the expansion of the lens housing to maintain focus.

Consider a system consisting of an afocal lens and an imager lens operating in the 2.9 to 4.2 µm wave band where the objective lens is a doublet with a positive zinc sulfide lens and negative gallium arsenide lens. Gallium arsenide has a significantly higher thermal coefficient of refractive index than zinc sulfide of which this property is used for thermal correction. The Abbe numbers for this wave band for these two materials are very close to each other so chromatic correction is not reasonably possible with these materials by determining the ratio of the powers of the two lenses for traditional achromatization. A diffractive surface is used on one of the surfaces to achieve chromatic correction. The ratio of the powers of the lenses is designed for desired athermalization. The desired athermalization scheme for this system is having the doublet increase in focal length with increasing temperature at a rate that maintains the position of the final image plane. The increase in focal length of the doublet compensates for the thermal expansion of the housing and the thermal focal length shifts of the remainder of the optics.

There is a possible problem with the ZnS-GaAs-diffractive surface combination for fast systems. Because of the dispersion properties of the materials, there is noticeable secondary chromatic aberration. However, if the secondary color is acceptable at nominal, it does not get worse with temperature.

The above described concept can be used in any system for which passive athermalization is desired. It can work for any wave band as long as, for the wave band of interest, there are two materials that have approximately the same Abbe number, different thermal coefficients of refractive index (the larger the difference the better) and acceptable diffraction efficiency.

DESCRIPTION OF THE PREFERRED EMBODIMENT

Figure 1:
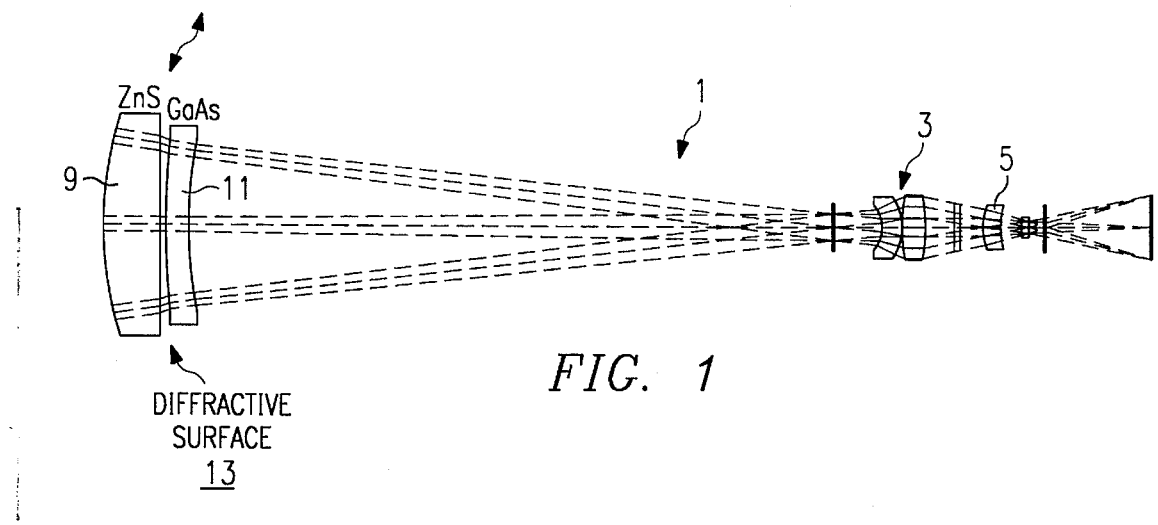
FIG. 1 is a cross sectional view of a lens system in accordance with the present invention.
Figure 2:
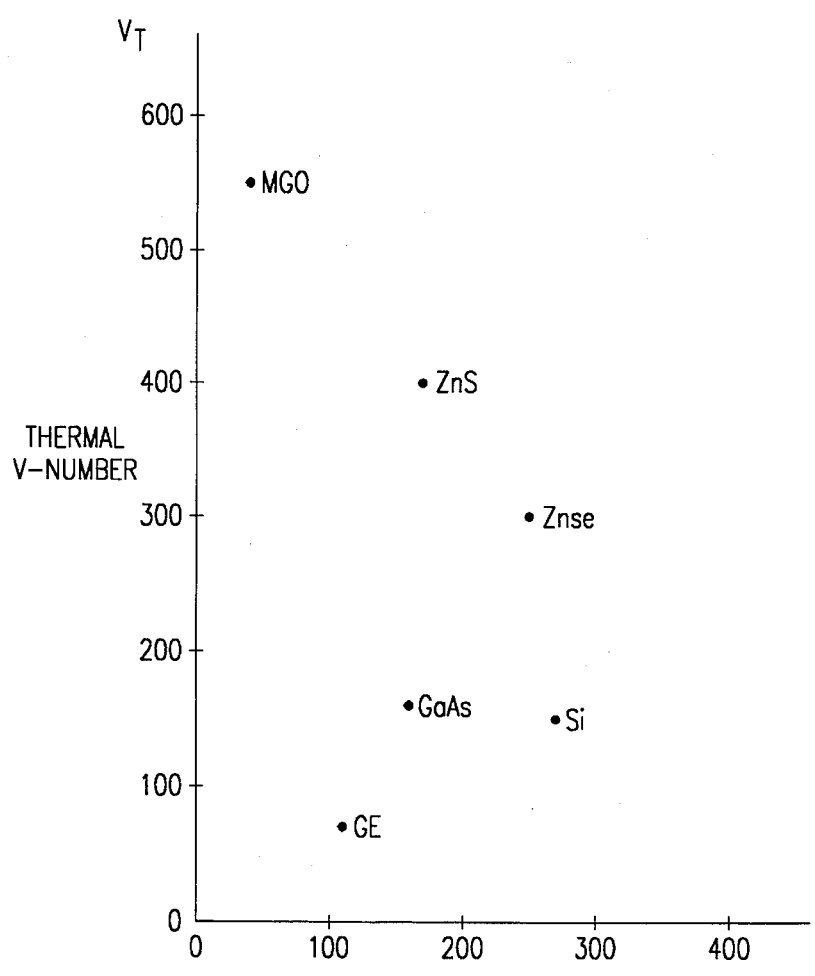
FIG. 2 is a graph showing Abbe v-numbers in the 2.9 to 4.2 µm range vs. thermal v-number for several materials.

Referring now to FIG. 1, there is shown a lens system 1 comprising an afocal lens 3 and 7 and an imager lens 5 operating in the 2.9 to 4.2 µm wave band where the objective lens is a doublet with a positive zinc sulfide lens 9 and negative gallium arsenide lens 11. Generally, the lens group with the longest focal length has the most control of focal shift. For most systems, the objective lens is the longest focal length. This concept can be used to control subsystems within a large system. The imager 5, eyepiece 3 and objective lens can all be athermalized doublets, each controlling its own focal length. Gallium arsenide has a significantly higher thermal coefficient of refractive index than zinc sulfide this property being used for thermal correction. The Abbe numbers for the 2.9 to 4.2 µm wave band for zinc sulfide and gallium arsenide are very close to each other as can be seen from FIG. 2. Therefore, chromatic correction is not reasonably possible with these materials by determining the ratio of the powers of the two lenses for traditional achromatization. A diffractive surface 13 as described in Ser. No. 08/181,263 is provided at the downstream surface of one of the lenses 9 or 11 (though it can be placed on any surface of either of the lenses), such diffractive surface being shown on the downstream surface of the zinc sulfide lens 9 in FIG. 1, to achieve chromatic correction. The ratio of the powers of the lenses are calculated for desired athermalization. The desired athermalization scheme for this system is having the doublet increase in focal length with increasing temperature at a rate that maintains the position of the final image plane by over-correcting the athermalization of the doublet. The increase in focal length of the doublet compensates for the thermal expansion of the housing and the thermal focal length shifts of the remainder of the optics.

If additional color correction is required at the eyepiece 3 and/or imager 5, a diffractive pattern as discussed in the above mentioned Ser. No. 08/181,263 on a surface of a lens of any of the lens systems requiring such color correction.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. A lens system which comprises:
    a doublet comprising first and second lenses having:
    (i) substantially the same Abbe number in the wavelength range of interest; and
    (ii) a different thermal coefficient of refractive index.

2. The lens system of claim 1 wherein one of said first and second lenses is a positive lens and the other of said first and second lenses is a negative lens.

3. The lens system of claim 1 wherein one of said first and second lenses is zinc sulfide and the other of said first and second lenses is GaAs.

4. The lens system of claim 2 wherein one of said first and second lenses is zinc sulfide and the other of said first and second lenses is GaAs.

5. The lens system of claim 3 wherein said zinc sulfide lens is said positive lens and said gallium arsenide lens is said negative lens.

6. The lens system of claim 4 wherein said zinc sulfide lens is said positive lens and said gallium arsenide lens is said negative lens.

7. The lens system of claim 1 wherein one of the surfaces of said first and second lenses is a diffractive surface.

8. The lens system of claim 2 wherein one of the surfaces of said first and second lenses is a diffractive surface.

9. The lens system of claim 7 wherein said diffractive surface is disposed between said first and second lenses.

10. The lens system of claim 8 wherein said diffractive surface is disposed on said first lens.

11. The lens system of claim 1, said system further including an eyepiece lens and an imager lens, said doublet and said eyepiece comprising an afocal lens.

12. The lens system of claim 2, said system further including an eyepiece lens and an imager lens, said doublet and said eyepiece comprising an afocal lens.

13. The lens system of claim 3, said system further including an eyepiece lens and an imager lens, said doublet and said eyepiece comprising an afocal lens.

14. The lens system of claim 4, said system further including an eyepiece lens and an imager lens, said doublet and said eyepiece comprising an afocal lens.

15. The lens system of claim 5, said system further including an eyepiece lens and an imager lens, said doublet and said eyepiece comprising an afocal lens.

16. The lens system of claim 6, said system further including an eyepiece lens and an imager lens, said doublet and said eyepiece comprising an afocal lens.

17. The lens system of claim 7, said system further including an eyepiece lens and an imager lens, said doublet and said eyepiece comprising an afocal lens.

18. The lens system of claim 8, said system further including an eyepiece lens and an imager lens, said doublet and said eyepiece comprising an afocal lens.

19. The lens system of claim 9, said system further including an eyepiece lens and an imager lens, said doublet and said eyepiece comprising an afocal lens.

20. The lens system of claim 10, said system further including an eyepiece lens and an imager lens, said doublet and said eyepiece comprising an afocal lens.

* * * * *